United States Patent [19]
Privalov et al.

[11] 3,879,983
[45] Apr. 29, 1975

[54] DIFFERENTIAL SCANNING CALORIMETER FOR THERMAL ANALYSIS OF LIQUIDS

[76] Inventors: Petr Leonidovich Privalov, Mikroraion "V," 29, kv. 38; Valerian Valerievich Plotnikov, Mikroraion "G," 9, kv. 47, both of Pushino Moskovskoi oblasti, U.S.S.R.

[22] Filed: Apr. 11, 1973

[21] Appl. No.: 350,160

[52] U.S. Cl. ............................................. 73/15 B
[51] Int. Cl. ..................... G01k 17/00; G01h 25/20
[58] Field of Search ........................ 73/15 B, 190 R

[56] References Cited
OTHER PUBLICATIONS

Tsong et al., "A Calorimetric Study of Thermally Induced Conformational Transitions of Ribonucleas A," in Biochemistry, Vol. 9, No. 13, 1970, pg. 2666-2667.

Danforth et al., "Differential Calorimetry of Thermally Induced Processes in Solution," in Review of Scientific Instruments, Vol. 38, No. 4, 4/67, pp. 484-487.

*Primary Examiner*—Herbert Goldstein

[57] ABSTRACT

A differential scanning calorimeter for thermal analysis of liquids, wherein the adiabatizing shell is made up by a pair of identical surfaces of revolution. Each one of these surfaces of revolution includes a convex portion adjoining a flat annular portion having grooves cut therein. The two surfaces of revolution are pressed together by their respective flat annular portions, so that their convex portions define jointly a closed spaced wherein the calorimetric cell is positioned, at least portions of capillary inlet and outlet passages of this calorimetric cell being defined by the grooves of the pressed together flat annular portions of the surfaces of revolution.

12 Claims, 1 Drawing Figure

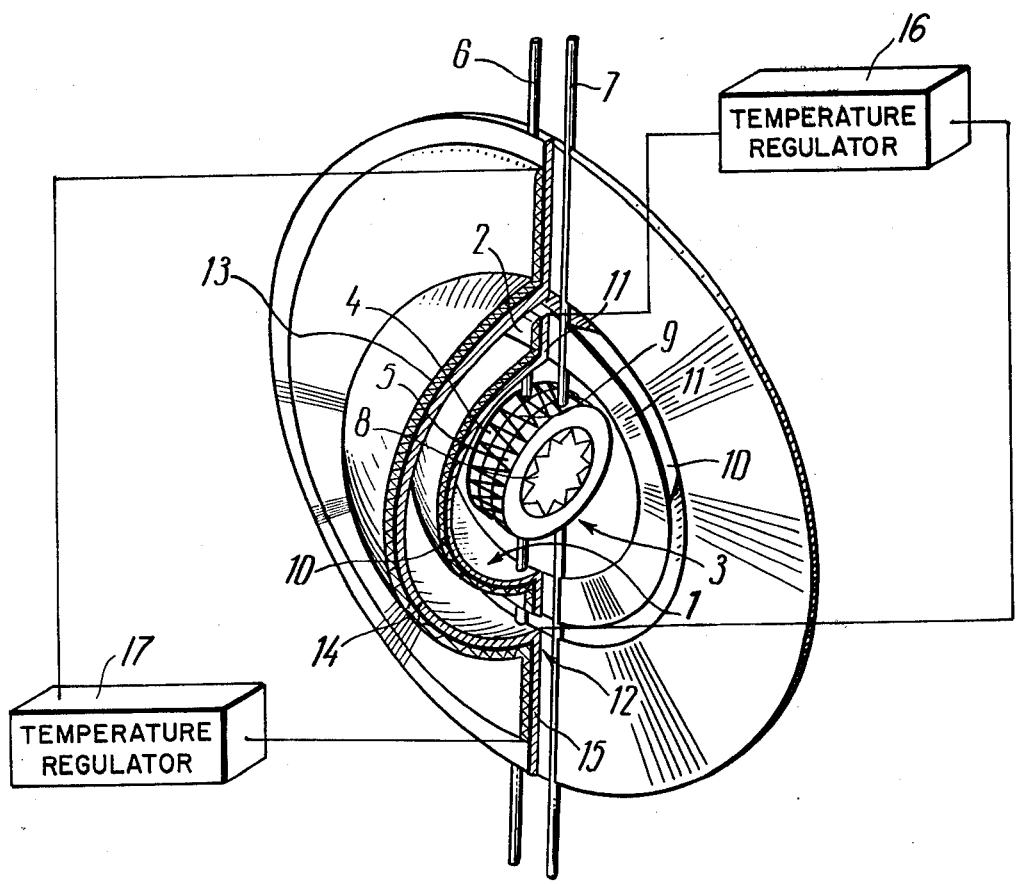

DIFFERENTIAL SCANNING CALORIMETER FOR THERMAL ANALYSIS OF LIQUIDS

The present invention relates to calorimeters intended for the precise thermal analysis of liquids that are being heated at a predetermined rate within a specified range of temperatures, and, more particularly, it relates to differential scanning calorimeters for thermal analysis of liquids.

Presently known is a differential scanning calorimeter for thermal analysis of liquids, having an adiabatizing shell associated with heating means electrically connected with a temperature regulator, this adiabatizing shell receiving therein a calorimetric cell with two chambers provided with capillary inlet and outlet passages, and with calorimetric cell being associated with a heating means and a temperature-responsive member.

Among the disadvantages of this prior art differential scanning calorimeter is, first of all, a relatively large thermal inertia of the adiabatizing shell which is provided in the form of a water thermostat of which the temperature is, with the help of a temperature regulator, as close as possible to the temperature of the calorimetric cell. Quite naturally, the scanning rate of this known calorimeter cannot be made high enough, and, consequently, the actual sensitivity of this known calorimeter is substantially limited. Furthermore, the large thermal inertia of the adiabatizing shell imposes relatively strict requirements to the performance of the shell temperature regulator, whereby the regulator is bound to be of a complicated structure, and, therefore, both costly and bulky. It should also be noted that the adiabatizing shell itself, when it is made in the form of a water thermostat, becomes a structurally complicated member which is insufficiently dependable during operation.

It is, therefore, an object of the present invention to provide a differential scanning calorimeter for the thermal analysis of liquids, which will considerably reduce and similarize the heat exchange between two calorimetric chambers and the ambient air, with respect of the thermal conductivity of the inlet and outlet capillary passages, and the heat exchange by radiation and convection.

This object is attained by means of a differential scanning calorimeter for thermal analysis of liquids, wherein the adiabatizing shell is associated with a heating means which is electrically connected with a temperature regulator and receives thereinside a calorimetric cell including two calorimetric chambers associated with capillary inlet and outlet passages, including heating means and a differential thermally responsive member, wherein, in accordance with the present invention, the adiabatizing shell of the calorimeter is made up by a pair of identical surfaces of revolution, each surface of revolution including a convex portion adjoining a flat annular portion having grooves cut therein, the two flat annular portions, respectively, of the pair of surfaces of revolution being pressed together, so that the convex portions thereof jointly define a closed space in which the calorimetric cell is received, and with the capillary inlet and outlet passages being defined by the grooves of the pressed together flat annular portions.

It is advantageous that the calorimetric cell should be so positioned within the adiabatizing shell that the centre of symmetry of the calorimetric cell coincides with the centre of symmetry of the adiabatizing shell.

In order to reduce the value of heat exchange between the calorimetric cell and the ambient air down to a desired level, the adiabatizing shell, with the calorimetric cell received therein can be enclosed within at least one similar auxiliary adiabatizing shell which is associated with a heating means electrically connected with an independent temperature regulator.

It is further advantageous that the auxiliary adiabatizing shell should be so positioned relative to the main adiabatizing shell that their respective centres of symmetry coincide, and the respective flat annular portions thereof extend in the same plane.

It is also preferable that the auxiliary adiabatizing shell be spaced from the main adiabatizing shell.

In accordance with one embodiment of the present invention, the respective convex portions of the surfaces of revolution, belonging, respectively, to the main and auxiliary adiabatizing shells, are each preferably shaped as a semi-sphere.

It is also preferable, that the respective heating means associated with the main and auxiliary adiabatizing shells be uniformly distributed over the respective external surfaces of the shells.

With a differential scanning calorimeter for thermal analysis of liquids being of the herein disclosed general structure, the calorimeter offers stable and recurring results of the analysis, in combination with a high degree of sensitivity of the calorimeter.

The present invention will be further described in connection with a preferred embodiment thereof, reference being had to the accompanying single FIGURE of the drawing illustrating a perspective, partly sectional, view of a differential scanning calorimeter constructed in accordance with the invention.

The herein disclosed differential scanning calorimeter for thermeal analysis of liquids comprises a main adiabatizing shell 1 associated with heating means 2 which is uniformly distributed over the external surface of the shell 1 and electrically connected with a temperature regulator 17.

The main adiabatizing shell 1 receives therein a calorimetric cell 3 including two calorimetric chambers 4 and 5 having capillary passages 6 and 7 for letting in and out, respectively, a liquid which is being investigated and a reference or standard liquid, a heating member 8 positioned adjacent to the end face of each one of these two chambers, and a thermally responsive member 9 encircling each one of these two chambers 4 and 5 about the external side surface thereof.

Thus, the calorimetric chamber 5 is filled with the reference liquid, while the chamber 4 is filled with the liquid being investigated.

The adiabatizing shell 1 is made up by a pair of identical surfaces of revolution. Each one of these surfaces of revolution includes a convex portion 10 adjoining a flat annular portion 11 which is provided with grooves. The two surfaces of revolution engage each other along their flat annular portions 11, so-that their respective convex portions 10 togther define a closed space in which the calorimetric cell 3 is positioned, whereas the capillary passages 6 and 7 extend along the abovementioned grooves intermediate of the two flat annular portions 11 the latter of which are firmly pressed and secured together.

In the above presently described embodiment of the invention, the two convex portions 10 of the adiabatizing shell 1 are shaped as semi-spheres. However, these portions may just as well be shaped as cylinders having flat bottoms.

The adiabatizing shell 1 receiving therein the calorimetric shell 3 is itself contained within a similar auxiliary adiabatizing shell 12 which is associated with a heating means 13 uniformly distributed over the external surface of the last-mentioned shell, and electrically connected with an independent temperature regulator 16. The adiabatizing shell 12 has a convex portion 14 and a flat annular portion 15.

The heating means 2 and 13 are electrically insulated from the respective shells 1 and 12.

Thus, the calorimetric shell 3 is located within the main adiabatizing shell 1, and the latter, in its turn, is located within the auxiliary adiabatizing shell 12, so that a uniform space remains intermediate of the main shell 1 and the auxiliary one 12, while the centres of symmetry, respectively, of the calorimetric cell 3, of the main shell 1 and of the auxiliary shell 12 coincide, and the flat annular portions 11 and 15 of the respective shells 1 and 12 extend in the same plane.

The herein disclosed differential scanning calorimeter for thermal analysis of liquids operates as follows.

The differential scanning calorimeter accordinig to the present invention is adopted to measure the difference between the thermal response of the calorimetric chambers 4 and 5 the latter of which are being heated at a predetermined rate. In order to minimize the influence of the ambient temperature on the result of the measurement, the calorimetric cell 3, as it has been described hereinabove, is positioned within the adiabatizing shells 1 and 12 which are maintained at a temperature following the temperature of the calorimetric cell 3 as closely as possible with the help of temperature regulators 16 and 17 controlling the electric current flowing through the respective heating means 2 and 13. Consequently, not only the heat exchange between the calorimetric cell 3 and the ambient air is positively minimized, but the heat exchange conditions of the two calorimetric chambers 4 and 5 are identical and are maintained constant throughout the entire temperature range.

In accordance with the herein disclosed structure of the calorimeter, the thinness of the shells 1 and 12 and the uniform distribution of the heating means 2 and 13 over their respective surfaces ensures a minimal thermal inertia of the shells 1 and 12 and are conducive in attaining a high degree of accuracy in maintaining these shells at a temperature equal to that of the calorimetric cell 3 throughout the operation of heating up of the cell. Moreover, the mutual symmetry of the shells 1 and 12 and of the calorimetric cell 3 provide for the formation of a maximally symmetrical temperature field about the cell 3, for attaining similarity of the heat exchange conditions of the two calorimetric chambers 4 and 5 and for heating up of the capillary passages 6 and 7 with the employment of a minimal number of temperature regulators.

The herein disclosed differential scanning calorimeter for thermal analysis of liquids offers stable and recurring results of the analysis, in combination with a high degree of sensitivity for the calorimeter, which may be as high as $3 \cdot 10^{-7}$ W.

The thermal inertia of the system including the two adiabatizing shells 1 and 12 and the power consumption properties thereof are so small that the power required for heating the shells 1 and 12 does not exceed 20 Watts at the peak of the temperature range, i.e., at 100°C.; moreover it has been also found to be possible to increase the rate of scanning up to several degrees Centigrade per minute. It is also essential that the herein disclosed structure for a scanning differential calorimeter has enabled simplication of the structure of the associated temperature regulators, so as to improve the reliability of their performance and to concurrently lower the production cost of the calorimeter.

What we claim is:

1. A differential scanning calorimeter for thermal analysis of liquids, comprising: an adiabatizing shell, said adiabatizing shell including two identical surfaces of revolution, each said surface of revolution incorporating a convex portion adjoining a flat annular portion, said flat annular portion of each said surface of revolution having grooves, said two identical surfaces of revolution being firmly pressed together by said flat annular portions thereof, so that said convex portions thereof define together a closed space; heating means associated with said adiabatizing shell; a temperature regulator electrically connected with said heating means associated with said adiabatizing shell a calorimetric cell disposed within said closed space; a first calorimetric chamber in said calorimetric cell; a second calorimetric chamber in said calorimetric cell; first capillary passage means for letting a liquid being investigated into and out of said first calorimetric chamber; second capillary passage means for letting a reference liquid into and out of said second calorimetric chamber; a portion of said first and second capillary passage means being defined by said grooves of said respective pressed together flat annular portions; heating means associated with said calorimetric cell; and a differential temperature responsive member encircling said first and second calorimetric chambers.

2. A differential scanning calorimeter for thermal analysis of liquids in accordance with claim 1, wherein said calorimetric cell is positioned within said adiabatizing shell so that the centre of symmetry of said calorimetric cell coincides with the centre of symmetry of said adiabatizing shell.

3. A differential scanning calorimeter for thermal analysis of liquids in accordance with claim 2, comprising at least one auxiliary adiabatizing shell similar to said main adiabatizing shell, said auxiliary adiabatizing shell enclosing therein said main adiabatizing shell with said calorimetric cell received therein; heating means associated with said auxiliary adiabatizing shell; an independent temperature regulator electrically connected with said heating means associated with said auxiliary adiabatizing shell.

4. A differential scanning calorimeter for thermal analysis of liquids in accordance with claim 3, wherein said auxiliary adiabatizing shell is spaced from said main adiabatizing shell.

5. A differential scanning calorimeter for thermal analysis of liquids in accordance with claim 3, wherein said auxiliary adiabatizing shell is so positioned relative to said main adiabatizing shell that the respective centres of symmetry of said shells coincide and said respective flat annular portions of said shells extend in the same plane.

6. A differential scanning calorimeter for thermal analysis of liquids in accordance with claim 5, wherein said auxiliary adiabatizing shell is spaced from said main adiabatizing shell.

7. A differential scanning calorimeter for thermal analysis of liquids in accorodance with claim 1, comprising at least one auxiliary adiabatizing shell similar to said main adiabatizing shell, said auxiliary adiabatizing shell enclosing therein said main adiabatizing shell with said calorimetric cell received therein; heating means associated with said auxiliary adiabatizing shell; an independent temperature regulator electrically connected with said heating means associated with said auxiliary adiabatizing shell.

8. A differential scanning calorimeter for thermal analysis of liquids in accordance with claim 7, wherein said auxiliary adiabatizing shell is so positioned relative to said main adiabatizing shell that the respective centres of symmetry of said shells coincide and said respective flat annular portions of said shells extend in the same plane.

9. A differential scanning calorimeter for thermal analysis of liquids in accordance with claim 8, wherein said auxiliary adiabatizing shell is spaced from said adiabatizing shell.

10. A differential scanning calorimeter for thermal analysis of liquids in accordance with claim 7, wherein said auxiliary adiabatizing shell is spaced from said main adiabatizing shell.

11. A differential scanning calorimeter for thermal analysis of liquids in accordance with claim 1, wherein said respective convex portions of said surfaces of revolution, belonging to said main and auxiliary adiabatizing shells, are each shaped as a semi-sphere.

12. A differential scanning calorimeter for thermal analysis of liquids in accordance with claim 1, wherein said respective heating means associated with said main and auxiliary adiabatizing shells are uniformly distributed over the external surfaces of the respective ones of said shells.

* * * * *